(12) United States Patent
Mallinson

(10) Patent No.: US 9,961,404 B2
(45) Date of Patent: *May 1, 2018

(54) MEDIA FINGERPRINTING FOR CONTENT DETERMINATION AND RETRIEVAL

(71) Applicant: Sony Interactive Entertainment Inc., Tokyo (JP)

(72) Inventor: Dominic S. Mallinson, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/258,955

(22) Filed: Sep. 7, 2016

(65) Prior Publication Data

US 2017/0013313 A1  Jan. 12, 2017

Related U.S. Application Data

(63) Continuation of application No. 14/981,562, filed on Dec. 28, 2015, now Pat. No. 9,473,820, which is a
(Continued)

(51) Int. Cl.
*H04N 5/445* (2011.01)
*H04N 21/4722* (2011.01)
(Continued)

(52) U.S. Cl.
CPC ... *H04N 21/4722* (2013.01); *G06F 17/30023* (2013.01); *G06F 17/30026* (2013.01);
(Continued)

(58) Field of Classification Search
CPC .................... H04N 21/26291; H04N 21/4316
See application file for complete search history.

(56) References Cited

U.S. PATENT DOCUMENTS 9,264,785 B2 *  2/2016  Mallinson ......... G06F 17/30026
9,473,820 B2 * 10/2016  Mallinson ......... G06F 17/30026
(Continued)

FOREIGN PATENT DOCUMENTS

WO  WO2008/051538 A2  2/2008  ............. H04N 7/025

OTHER PUBLICATIONS

EP 11 76 3481 Supplementary European Search Report, Berlin, dated Feb. 4, 2016.

*Primary Examiner* — Junior Mendoza
(74) *Attorney, Agent, or Firm* — Martine Penilla Group, LLP

(57) ABSTRACT

Audio fingerprinting and other media matching technologies can be used to identify broadcast media, such as television shows and radio broadcasts. A user device can record image, audio, and/or video information and upload information to a matching service that is able to use matching technology to identify the media and provide supplemental content or information to the user. The user might receive information identifying a product in an advertisement, identifying an actor on screen in a movie at a particular time, or other such information. In some embodiments, the user can receive access to a digital copy of the captured media, such as the ability to download a copy of a program in which a user expressed interest. Since a user might capture media information after the point of interest, a device can buffer a window of recently captured media in order to attempt to identify the intended media.

22 Claims, 5 Drawing Sheets

Related U.S. Application Data continuation of application No. 12/752,979, filed on Apr. 1, 2010, now Pat. No. 9,264,785.

(51) Int. Cl.

| | | |
|---|---|---|
| *G06F 17/30* | (2006.01) | |
| *G06K 9/00* | (2006.01) | |
| *H04N 21/44* | (2011.01) | |
| *H04N 21/8352* | (2011.01) | |
| *H04N 21/218* | (2011.01) | |
| *H04N 21/2225* | (2011.01) | |
| *H04N 21/232* | (2011.01) | |
| *H04N 21/233* | (2011.01) | |
| *H04N 21/81* | (2011.01) | |
| *H04N 21/2187* | (2011.01) | |
| *G06F 3/0484* | (2013.01) | |

(52) U.S. Cl.
CPC .. *G06F 17/30041* (2013.01); *G06F 17/30044* (2013.01); *G06F 17/30386* (2013.01); *G06F 17/30784* (2013.01); *G06F 17/30979* (2013.01); *G06F 17/30991* (2013.01); *G06K 9/00758* (2013.01); *H04N 21/218* (2013.01); *H04N 21/2187* (2013.01); *H04N 21/2225* (2013.01); *H04N 21/232* (2013.01); *H04N 21/233* (2013.01); *H04N 21/44008* (2013.01); *H04N 21/812* (2013.01); *H04N 21/8133* (2013.01); *H04N 21/8352* (2013.01); *G06F 3/04847* (2013.01)

(56) References Cited

U.S. PATENT DOCUMENTS

| | | | |
|---|---|---|---|
| 2003/0185541 A1 | 10/2003 | Green | 386/46 |
| 2005/0227674 A1* | 10/2005 | Kopra | H04M 1/72522 455/414.1 |
| 2006/0038833 A1 | 2/2006 | Mallinson et al. | 345/633 |
| 2006/0285772 A1 | 12/2006 | Hull et al. | 382/305 |
| 2007/0124756 A1 | 5/2007 | Covell et al. | 725/18 |
| 2007/0130580 A1 | 6/2007 | Covell et al. | 725/18 |
| 2007/0143778 A1 | 6/2007 | Covell et al. | 725/19 |
| 2008/0267584 A1 | 10/2008 | Green | 386/95 |
| 2009/0063277 A1 | 3/2009 | Bernosky et al. | 705/14 |
| 2009/0154806 A1* | 6/2009 | Chang | G06F 17/30781 382/173 |
| 2009/0157391 A1* | 6/2009 | Bilobrov | G06F 17/30743 704/200.1 |
| 2009/0285444 A1 | 11/2009 | Erol et al. | 382/100 |
| 2010/0119208 A1* | 5/2010 | Davis | H04N 5/765 386/291 |
| 2010/0166309 A1 | 7/2010 | Hull et al. | 382/176 |
| 2011/0078729 A1* | 3/2011 | LaJoie | G11B 27/28 725/36 |
| 2012/0059845 A1 | 3/2012 | Covell et al. | 707/769 |
| 2012/0099760 A1 | 4/2012 | Bernosky et al. | 382/100 |
| 2012/0143679 A1 | 6/2012 | Bernosky et al. | 705/14.46 |
| 2014/0067863 A1* | 3/2014 | Bilobrov | G06K 9/00711 707/780 |
| 2015/0156542 A1 | 6/2015 | Covell et al. | |
| 2015/0379043 A1 | 12/2015 | Hull et al. | |
| 2017/0013314 A1* | 1/2017 | Mallinson | G06F 17/30026 |

\* cited by examiner

MEDIA FINGERPRINTING FOR CONTENT DETERMINATION AND RETRIEVAL

CROSS-REFERENCES TO RELATED APPLICATIONS

This application is a continuation of and claims priority to and the benefit of U.S. patent application Ser. No. 14/981,562, filed on Feb. 28, 2015; which is a continuation of and claims priority to and the benefit of U.S. application Ser. No. 12/752,979, filed Apr. 1, 2010, all of which are hereby incorporated by reference in their entireties for all purposes.

BACKGROUND

Today's consumers are exposed to increasing varieties and amounts of information from an increasing number of sources. Many times, a consumer will have a television or other source of information playing in the background while performing another activity, such as reading an electronic book, texting a friend, or playing a game on a handheld device. Other times, a user may simply be walking back in forth from a room in which audio or video content is being played. Since the user is not paying complete attention to the media being played, the user might only return his or her attention to the media when there is something of interest presented, such as a commercial, intense action scene, song of interest, etc. If the user was not paying attention to the media, the user might not know exactly what it going on. In the case of a commercial, for example, the user might turn his or her attention to the commercial towards the end of the commercial when it is too late to determine the product or service being advertised.

In other cases, a user might be focusing his or her primary attention on an audio or video presentation, but might want to determine information pertaining to that presentation. For example, if a commercial for an item is on the screen then the user might want to find out other information about that item, such as where the item is sold or how much the item costs. If a user is watching a movie, the user might want to know the name of the actor in the current scene, where the scene takes place, or what type of shirt the main actor is wearing. While a user can attempt to locate the information by performing a Web search or using other such approaches, the consumer often will not have a paper and writing instrument available to take the necessary notes, and might not have enough detailed information to write down anyway. If the consumer is not able to take notes right away, the consumer might forget details about the presentation, or even what was interesting in the presentation in the first place.

BRIEF SUMMARY

Systems and method in accordance with various embodiments address at least some of these and other deficiencies in conventional approaches to identifying, locating, and/or accessing supplemental content or relevant information pertaining to media presentations. In particular, various embodiments enable a user to capture information about a video presentation, such as by recording an audio and/or video segment of the presentation using an appropriate user device. The video presentation can be any appropriate presentation, such as a live television broadcast, an on-demand movie, video content rendered from a physical medium, etc. The user can cause a request to be submitted to a remote system or service, for example, to attempt to identify or obtain additional information about at least one aspect of the video presentation.

For example, a user might capture information about a commercial for a particular product. In response, a system identifying the commercial can send the user information such as product information, specifications, or pricing, as well as links to a manufacturer website or a location where the user can purchase the product. In another example, a user might capture information about a scene in a movie. In response, a system identifying the movie can send the user information such as the title and year of the movie, actor information, information about products in that scene, or other such information. The system can also provide the user with the ability to obtain a copy of the movie, such as providing a link to the movie or pushing a version of the movie to an identified device. Various other examples are described below in relation with the various embodiments.

In one approach to providing supplemental content, a request is received from a user that includes audio and/or video data recorded from a video presentation by a user device. The captured media file, or information corresponding to the file, is compared with stored instances of media data to attempt to locate a match for the captured media file. At least a portion of the instances of stored media data each correspond to identified video content, such as a particular movie, program, or commercial. If a match is located, supplemental information can be determined or located that corresponds to the identified video content. This supplemental content then can be provided to the user, either via the user device or another designated device. The supplemental content can include any appropriate content, such as advertising information, product information, trivia information, purchasing information, download information, a media file, search results, or an address or link to related content.

The matching process can use any appropriate technique for matching content. In one embodiment, an audio fingerprinting process is used to match audio recorded from a video presentation with information stored in a database. Other appropriate techniques can be used as well. The media file can include content recorded just prior to the user activating a capture option, such that the media file might include multiple segments of content. The matching process can divide these segments and attempt to match each segment. The matches then can each be provided to the user, or the user can be provided with an option to select one of the matches. Various other types information can be used with the matching process as well, such as an approximate geographic location from which the request was sent, a timestamp received with the request, or a source of the video content.

A database of content useful for matching ("matching content") can be generated in part by receiving identifying information and supplemental content from various providers or other sources of the content, and storing this information to the database according to a specified schema, etc. Matching content can also be generated by receiving broadcasts, streams, or other sources of media content, and automatically analyzing that content to attempt to determine identifying information. For example, a broadcast stream can be segmented into related segments of content (e.g., programs or commercials) and each of these segments (or at least selected segments meeting at least one criterion) can be analyzed for identifying information. The content can be analyzed using processes such as audio fingerprinting, image recognition, optical character recognition, voice recognition, closed caption information detection, etc. For identified content, the system can attempt to locate supplemental content, such as by looking at related media, performing content searches, etc. The database also can store relationships between segments that were broadcast adjacent to each other, such as commercials broadcast during a particular event, such that a user can identify content at around the time the user captured the media information, even if the user was able to capture information over a period of time that may or may not have included the desired content.

Various other aspects and approaches should be apparent to one of ordinary skill in the art in light of the teachings and suggestions contained herein.

BRIEF DESCRIPTION OF THE DRAWINGS

Various embodiments in accordance with the present disclosure will be described with reference to the drawings, in which.

DETAILED DESCRIPTION

Systems and method in accordance with various embodiments provide for the identifying, locating, and/or accessing or supplemental content relating to media presentations. In particular, approaches in accordance with the various embodiments utilize a process such as video and/or audio fingerprinting to identify content being presented through at least one electronic device. A user can record, capture, or otherwise store audio, image, and/or video information that can be used to determine at least an identity of a specified piece of media. Various embodiments can identify other aspects as well, such as a version of the media or time marker in the media presentation. Based at least in part upon this information, a consumer "tagging" a particular instance of media content can receive any of a number of types of information or content relating to that media. A consumer also can be presented with various other options, such as to purchase or download a version of that media or one or more items related to that media. Various other alternatives are possible within the scope of the various embodiments.

Figure 1:
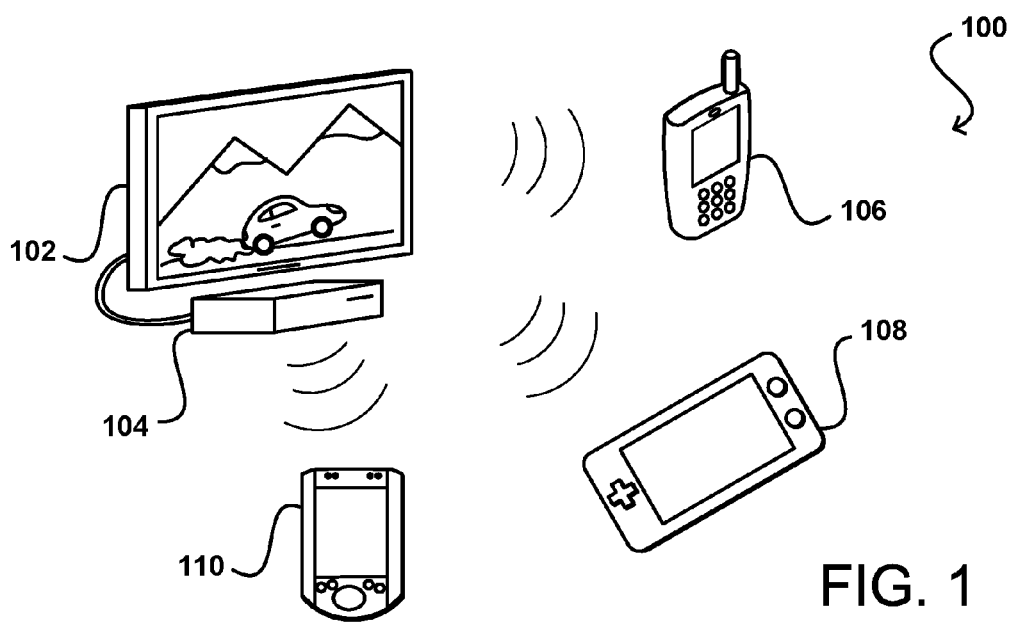
FIG. 1 illustrates a variety of user devices that can be utilized in accordance with various embodiments.

FIG. 1 illustrates an example environment 100 wherein a consumer is watching a video program displayed on a display device 102, such as a television, computer monitor, or video screen, among others. The display device 102 typically will provide a video image as well as a corresponding audio signal, although other devices can be utilized that only utilize still images, audio, or video content. The consumer might have any of a number of other electronic devices within an audible or viewing range of the display device 102, such as at least one stationary component 104 connected to the display device, such as a video player, gaming system, or set top box. Further, the consumer might have devices such as a cell phone 106, portable gaming device 108, personal data assistant (PDA) 110, or any of a number of other such computing or electronic devices.

At least one of these electronic devices can have the ability to capture information about the media being presented through the display device 102. For example, an electronic device might have a video camera operable to capture a video segment, or at least one or two frames, of content displayed on the display device. Another device might have digital recording circuitry such that the device can capture audio information corresponding to the presented media over at least a minimum period of time, such as at least 2, 5, or 10 seconds. For directly connected devices, the audio feed can be directly (via analog to digital (A2D) or pure digital) monitored by a module or application of the device. For portable devices, a microphone or other such media capturing element can periodically, continually, or at selected times sample or capture the audio (and/or video or images) of the broadcast. The electronic device can also include at least one output mechanism, such as a network connection or output port, enabling the electronic device to provide information about the captured content to an external system or service.

Figure 2:
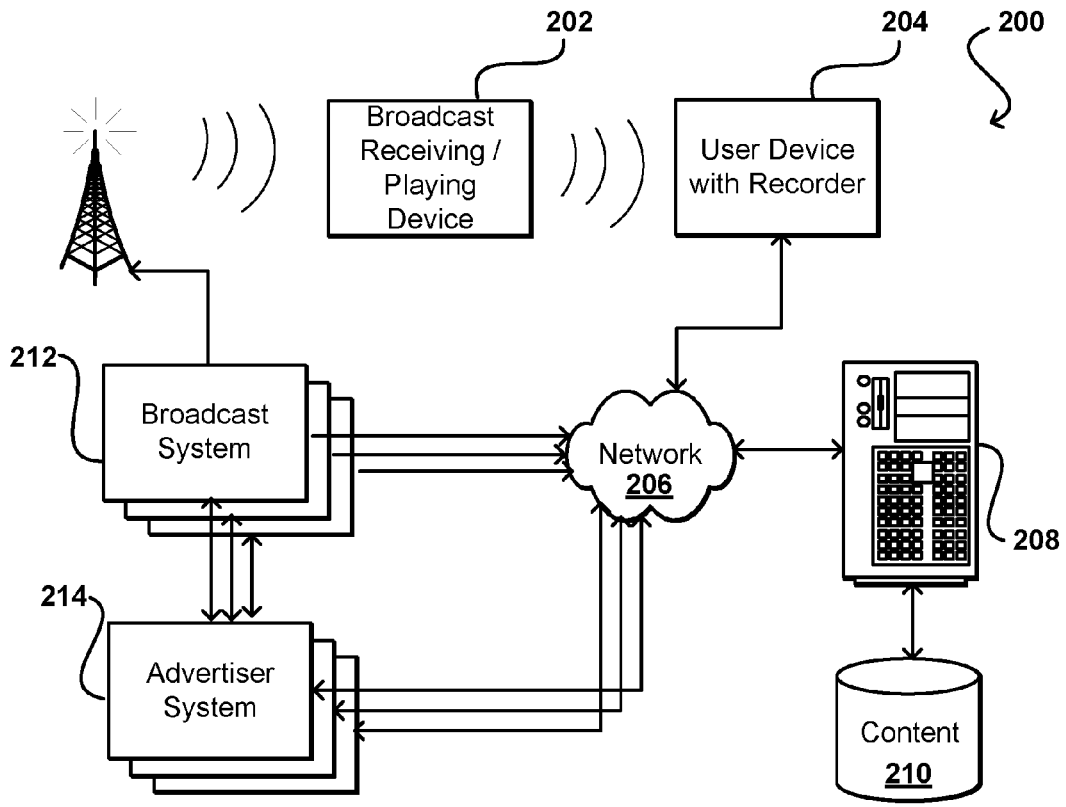
FIG. 2 illustrates an environment in which various embodiments can be implemented.

For example, consider the environment 200 of FIG. 2. In this example, the user device is able to connect to a remote server 208 (or other such system, service, or device) via a connection to at least one network. The network can be any appropriate network or combination of networks, such as a cellular network, broadband network, an intranet, the Internet, a private peer-to-peer network, etc. The user device 204 can be connected to the network using a direct network connection, such as a cellular or Wi-Fi connection, or can connect to the network via one or more intermediate devices, such as a docking station or home computer. The user device 204 can cause information about the captured content to be uploaded to the remote server, whereby the server can attempt to match the information against information stored in at least one data repository 210 or other such storage location. As should be understood, there can be one or more servers at different levels connecting to one or more data sources, such as a web server, application server, and/or search server connecting to at least one database to obtain information for the content and/or the consumer. In addition to at least one server 208 and at least one database 210, a supplemental content provider, media matching service, or other such entity can utilize any of a number of additional components and applications known or subsequently developed for such purposes. For example, a matching service can be configured to receive Web service requests, which are received by at least one router and/or Web server to direct each request to an application server or other such component for processing each request. At least one application server can execute instructions to provide at least one module, such as a recognition module or other such component, for identifying content, such as advertising, and selecting corresponding supplemental content, such as additional advertising or product information.

In various embodiments, a content provider such as a broadcaster 212 or an advertiser 214 can provide information about specific instances of content, which can be parsed, analyzed, or otherwise processed as discussed elsewhere herein and stored to a database 210 for subsequent content matching and other such purposes. The advertiser 214 (and any other appropriate content provider) also can provide information to the various broadcast systems 212, or other such broadcasting entities, which can cause the content to be broadcast (as a commercial or as product placement within or overlaying programming) or otherwise transmitted and received by the broadcast receiving and/or playing device 202. Any appropriate components or systems can be used for the purposes of transmitting and/or receiving broadcast signals as known or subsequently developed in the art. The broadcast receiving and/or playing device can include one or more components operable to receive and decode the broadcast signal, as well as to display or otherwise convey the content. Such a device can include at least one of a set top box, television, satellite receiver, analog or digital audio receiver, radio, video game console, media player, or other such component. Further, while an over-the-air broadcast example is shown, it should be understood that any other broadcasting approach such as digital cable, radio waves, or satellite communications can be used as well within the scope of the various embodiments. Any broadcast of content such as video, television, or radio broadcasts of any type can be used in accordance with various embodiments.

If a match is located, information corresponding to the match can be transmitted to the user. In embodiments where the user captures the information with a computing device such as a smart phone, information such as the identity of the content can be transmitted to the device itself, such that the user can obtain the information on the same device that was used to capture the content. In other embodiments, the information might be sent to another device by the user, as might be specified by the user or otherwise determined. For example, a user might capture the content with a cell phone, but wish to receive results via email or another appropriate mechanism to a home computer, whereby the user can access information such as related websites, product pages, etc. In other embodiments, the information might be transmitted to a cable box or digital video recorder (DVR) to schedule a recording of the next occurrence of that program for the user. In still other embodiments, the user might have the information transmitted to a gaming console, portable media player, or other such electronic device that is able to download or otherwise access specific content corresponding to the identified media. In some embodiments, the user can select the device to receive the content at approximately the time that the information is captured and/or uploaded for analysis. For example, a user interested in a program being displayed might cause the results to be sent to a DVR, whereby the DVR can automatically record the next instance of that program, while a user interested in a shirt an actor in the program is wearing might cause the information to be sent to a home computer, whereby the user can follow or select certain information about the content. The user also can specify, in some embodiments, the type of information to be retrieved, such as a copy of the content, information about a product being displayed, actor or other program-specific information, etc. Any appropriate interface for selecting such information can be used as would be apparent to one of ordinary skill in the art in light of the teachings and suggestions contained herein.

Figure 3:
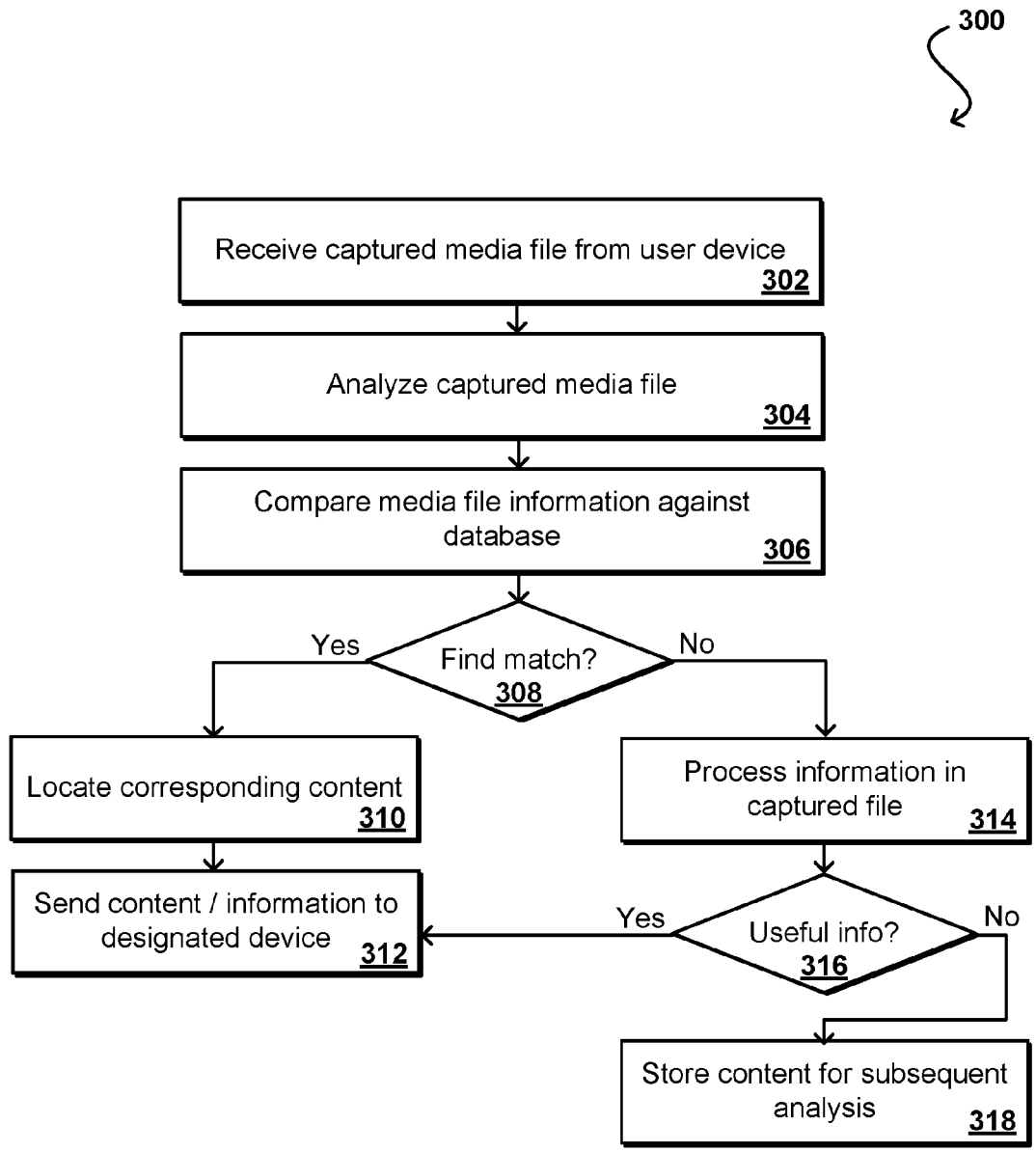
FIG. 3 illustrates an example process for determining supplemental content corresponding to user-captured content in accordance with one embodiment.

FIG. 3 illustrates an example process 300 for matching content captured by a user that can be used in accordance with various embodiments. In this example, the captured media file (e.g., audio, video, and/or one or more images) is received from the user 302. In some embodiments, the captured media file can be at least partially analyzed on the user device, such that information such as matching information or other identifying data can instead be received from the user device. The received media file can be analyzed 304, such as to extract or generate hash values or other such identifying characteristics. Information for the analyzed media file (e.g., hash information) can be compared against comparable information stored in at least one database 306 or other such location. In certain embodiments, an audio fingerprinting process is used to compare audio information captured by the user with audio information stored in the database. Whether the user captured audio and video or image content, or audio content alone, for example, the audio portion can be analyzed to attempt to determine the content that was captured by the user. Approaches to audio fingerprinting are described, for example, in U.S. Pat. No. 7,549,052, issued Jun. 16, 2009, entitled "Generating and Matching Hashes of Multimedia Content," which is hereby incorporated herein by reference.

If a match is located using the database 308, corresponding content (referred to herein as "supplemental content") can be determined and/or located for the matching content 310. For example, if the captured content is determined to be a commercial for a product, the supplemental content can include information such as a name of the product and/or manufacturer, a digital copy of the commercial, a link or other navigational element to locate information for the advertisement (e.g., a website for the product), or other such content. If the captured content corresponds to a television program, the supplemental content can include information such as identities of the actors or locations included in the program, a location to access or download a version of the program, etc. Various other types of supplemental content can be provided as well as discussed or suggested elsewhere herein. Any located supplemental content can then be provided to at least one designated device or location 312, such as by sending information to the requesting user device, sending a version of the program to an identified media player or other such device, generating a page of information and providing a link accessible by a user, etc. In some embodiments, the user can identify or otherwise selection the type of supplemental content to be received, a location to send the content, and other such information.

If no match is located in the database, at least within a threshold level of confidence or other such matching accuracy criterion, information in the captured media file can be further processed in an attempt to locate useful information 314. For example, the captured content can be analyzed using voice or image recognition, optical character recognition (OCR), or any other appropriate approach discussed elsewhere herein in an attempt to determine any useful aspect of the captured content. For example, an OCR process can automatically detect the presence of a web address (e.g., a URL) in a commercial, and can at least provide the web address or a link to the user whether or not the system can otherwise match the content. If useful information is located 316, that information can be provided to the user in any of the ways discussed above 312, such as to send any information about the content to the user. For example, the system might not be able to exactly match a commercial, but based on closed captioning content and image recognition might be able to determine that the content was a commercial for a particular type of shoe, and can provide at least that much information to the user. In some embodiments, this information can be fed back into the image matching algorithm to attempt to increase the confidence score of at least one of the results. For example, there can be longer and shorter versions of the same commercial that might not initially match within a given confidence level, but based at least in part upon the additional determined information the confidence score might be increased such that a likely match can be determined. If no useful information can be determined, or if the useful information does not result in finding at least one match, the information for the captured content can be stored for subsequent analysis 318, such as after a broadcaster provides another batch of content or after the system has a period of time to build information in the database, etc. In some examples, the user might record content corresponding to a live broadcast, such as of a sporting event or other real-time performance. In such an instance, as may be determined at least in part upon the channel and/or timestamp provided with the captured information, the matching service might store the information in a special queue or other location until the system is able to analyze the broadcast and provide appropriate matching information and/or supplemental content. The system also can use other information, such as the IP address or other location-related information, in order to attempt to narrow the search window with respect to broadcasts in a certain area (such as for a local sporting team).

Figure 4:
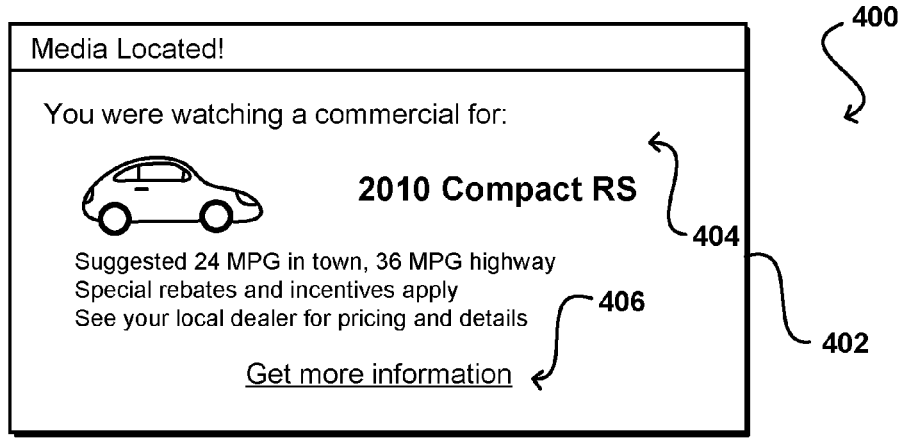
FIG. 4 illustrates a first example display of supplemental content in accordance with one embodiment.

FIG. 4 illustrates a first example 400 of a display of supplemental content 402 that can be provided to a user in response to the user uploading captured media information. In this example, the user captured media content corresponding to an advertisement for a vehicle. The user can, in response to capturing the media, receive information indicating that the media corresponded to a commercial, and information identifying that which was being advertised in the commercial 404, here a particular vehicle. The supplemental content can include any appropriate type of information, such as one or more images of the vehicle being advertised, specifications about the vehicle, instructions or links to access a version of the advertisement or related advertisements, links to a website for the vehicle manufacturer, contact information for the local dealer, etc. In some embodiments the user will receive a first display of content 402, which can include basic identifying information, and can receive or otherwise be provided with at least one option 406 to obtain additional information or access additional content. In some embodiments this can be a hyperlink or other navigational element to access more detailed information, while in other embodiments this can be a request sent back to the matching server or service, etc., to obtain additional information available about the content. Various other options can be provided as well as should be apparent in light of the teachings and suggestions contained herein.

Figure 5:
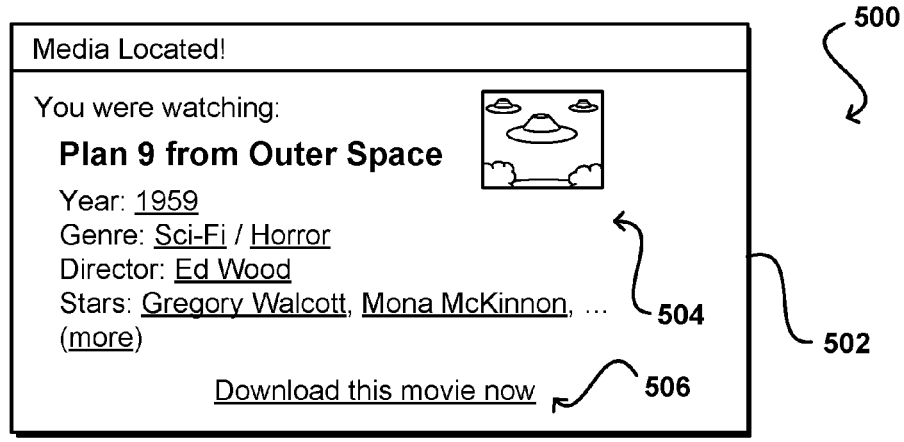
FIG. 5 illustrates a second example display of supplemental content in accordance with one embodiment.

FIG. 5 illustrate an example 500 of another display 502 of supplemental content that can be provided to a user in accordance with various embodiments. In this example, the user captured content corresponding to a particular movie. In response, the user can receive information 504 corresponding to the movie, such as actor or director information, year of production and studio information, images of scenes from the movie, etc. The user can also receive at least one selectable option 506 to download, purchase, or otherwise obtain a version of the movie. As discussed, in some embodiments the movie can be manually or automatically downloaded to a separate device, such as a computer or media recorder. In other embodiments, the user can select a hyperlink to navigate to a webpage or other location wherein the content can be streamed, downloaded, or otherwise accessed.

Figure 6:
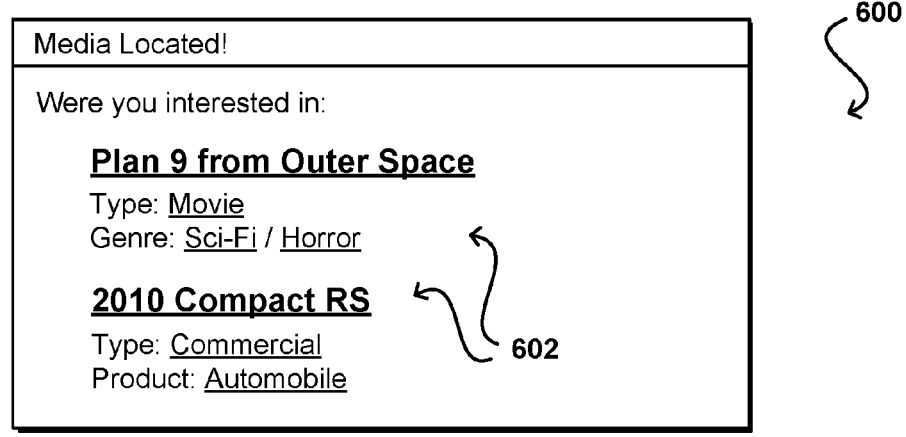
FIG. 6 illustrates an example display wherein a user is able to select the intended content in accordance with one embodiment.

As discussed, in some cases the user might have captured content that included more than one instance of content, or have captured content just after a previous instance of content completed. FIG. 6 illustrates an example of a display 600 that could be presented to a user in such a situation. For example, a user could have captured media that included the end of a scene of a movie, as well as the beginning of a commercial shown during that movie. In this case, the user can be presented with options 602 identifying each match that was determined for a portion of the captured media file, and the user can select the content which was of interest to the user. In some embodiments, this selection can cause another request to be sent to the matching system or service, which can provide more detailed information or content corresponding to the user selection. Various other types of screens, inputs, and content can be provided or utilized within the scope of the various embodiments as should be apparent to one of ordinary skill in the art in light of the teachings and suggestions contained herein.

Various processes can be used for obtaining the content matching information, as well as the supplemental content corresponding to that media. As discussed, media stored for matching purposes can include any appropriate information such as audio content, image content, video content, textual content, value ranges, hash values, etc. This content can come from any appropriate source, such as a provider of the content, a broadcaster or advertiser of the content, a service that provides matching content, etc. In other embodiments, or where information for particular media content is not provided, systems and services can analyze broadcasts or other transmissions or performances in order to determine information for various media content and build up one or more databases useful for content matching.

Figure 7A:
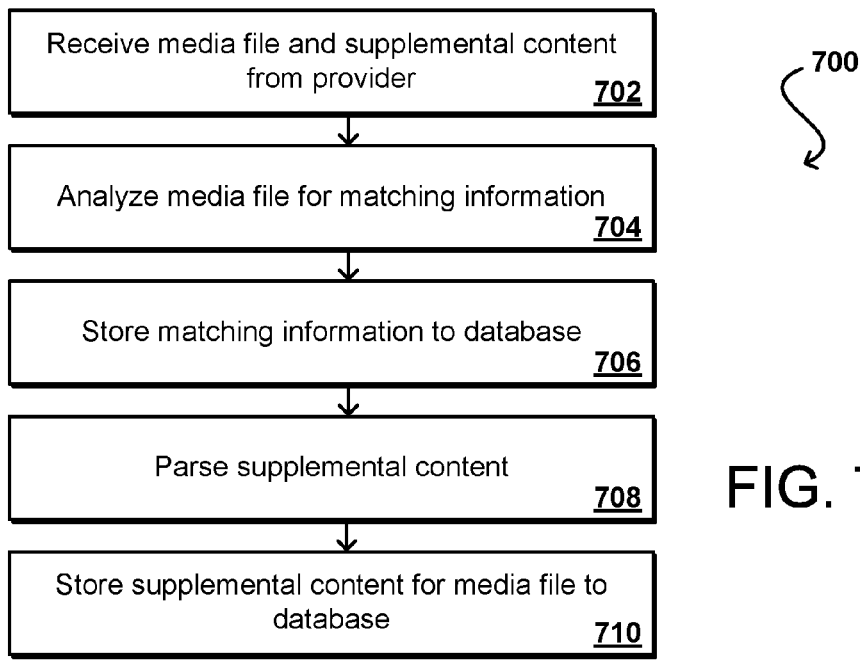
FIGS. 7(a)-7(b) illustrate processes for populating a database with matching information and supplemental content that can be used in accordance with various embodiments.

For example, FIG. 7(a) illustrate a first example process 700 for building a database using information received from a content provider or other such source that can be used in accordance with various embodiments. As should be understood, the various processes discussed herein can be performed using additional, fewer, or alternative steps, in varying orders or in parallel, unless otherwise specified, within the scope of the various embodiments. In this particular example, information about media content is received from a content provider such as a broadcaster or an advertiser 702. For example, a broadcaster might provide a content matching service with a copy of an audio or video portion of a program. In some embodiments, this copy is a full resolution or other such copy of the program, while in other embodiments the copy can be a lower resolution or compressed version of the program. In other embodiments, the information about the program is not a true audio or video file, but includes data that can be correlated to that program, such as hash values for a segment of the program. In another example, the broadcaster might provide frequency or Fourier transform data about a program, analytical or matching data for distinctive portions of the program, or any other appropriate information that can be used to match the program to the user-captured content. Similarly, an entity such as an advertiser can provide information for audio and/or video advertisements, etc.

An application server or other appropriate computing or processing device, system, or service can receive and analyze the media content received from the provider to determine "matching" information 704, such as hashes or audio fingerprint values, if not already received from the provider. In some embodiments, the system can analyze the media content even if the provider included hash values, etc., in order to ensure accuracy or other such aspects. Once sufficient matching information is determined, the matching information can be stored to an appropriate database 706 or other such storage location. Once the matching information is determined, or at any other appropriate time in the process, the system can extract, parse, or otherwise determine supplemental content received from the provider (or other source) that corresponds to the media content 708. In some embodiments, this can involve parsing an XML document or similar file according to specified tags to extract specific information about the content. In some cases, manual entry of received information into the database can be required. The supplemental content, or information identifying or pointing to the supplemental content, for example, can be stored to an appropriate database for subsequent access when user-captured information matches the corresponding media content. As should be understood, the matching information and supplemental content can be stored in the same, similar, or different databases or storage locations within the scope of the various embodiments.

Figure 7B:
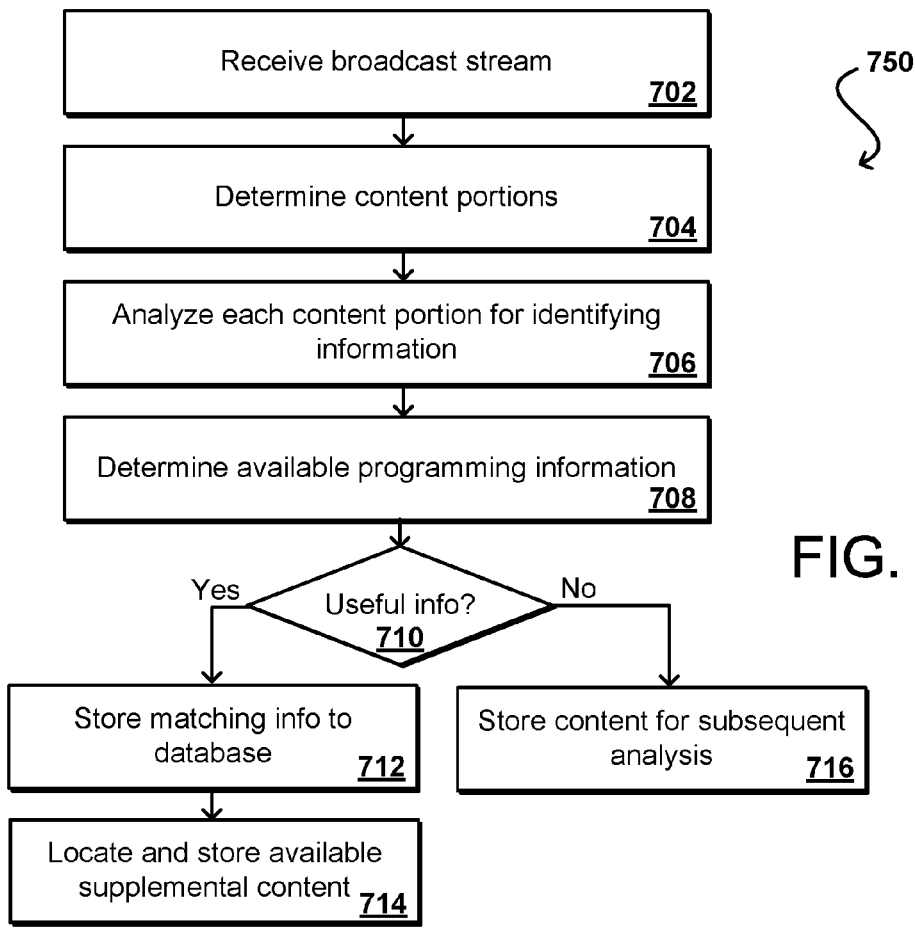

As discussed, a matching system or service also can desire to match content that was not specifically provided by a broadcaster or other such source. In various embodiments, as discussed above, a matching service or other such entity can monitor broadcasts from any of a number of different broadcasters, using over-the-air (OTA) signals, cable or broadband signals, or any of a number of other appropriate broadcast signals or transmissions. FIG. 7(b) illustrates a second portion of a process 750 for building a content matching database that can be used in combination with, or separate from, the process of FIG. 7(a). In this example, a broadcast stream or other transmission of media content is received 702 by at least one component in communication with the matching service, or a database utilized by the matching service. The media content is analyzed to attempt to determine unique, or at least unrelated, segments of the broadcast or transmission 704. In some embodiments, one or more algorithms can be used to attempt to break each broadcast into separate segments, such as scenes of a program, advertisements between program segments, etc.

The content segments can each be analyzed using any of a number of different approaches to attempt to determine identifying information 706. For example, a system can first compare a segment with information in the appropriate database to determine whether if the same, or a substantially similar, segment has previously been identified. If not, the system can attempt to analyze the contents of the media segment using any appropriate technique, such as optical character recognition (OCR) to analyze any writing or characters present in the video portion, voice recognition to attempt to analyze any spoken or verbal information in the audio portion, facial recognition to attempt to determine the identity of a character in the media portion, image recognition to attempt to identify any item shown in the media segment, or closed caption or alternative channel analysis to attempt to capture and/or interpret any other information associated with that content segment. Any appropriate information obtained from the media segment can be used to attempt to identify at least some aspect of the content. For example, a commercial might have the name of the product, or at least the name of the advertising company, that can be identified using OCR or a similar technique. In other embodiments, a logo or other graphic might be displayed that can be recognized or otherwise identified. In yet other embodiments, a jingle or sound clip might be identified that is associated with a particular company, etc. Any such information can be used to identify at least an aspect of the media clip. The matching system also can receive and/or access programming information for various broadcasts, either from the broadcaster or a third party. The system then can attempt to determine and or correlate programming information with the program segments extracted from the broadcast stream at a particular time 708.

If the system was able to locate identifying or otherwise useful information 710, for example, the media content and/or matching information for the identified media content can be stored to at least one database for subsequent matching, analysis, and/or retrieval 712. The system can also attempt to locate and/or store supplemental content corresponding to the identified media content 714. In some embodiments, the system can search for information relating to the content using any appropriate source, such as an Internet search engine, etc. In some embodiments, the system can execute at least one search using any potential keywords extracted from the content, such as product names or other detected words. For example, if the advertisement is for a medicine, and the commercial lists symptoms and indicates that the user should "consult a physician," then the system can search on the symptoms, the word "physician," etc. In some embodiments, the system can monitor which results are ultimately selected or viewed, and can store these as supplemental content for that identified media content. Where possible, the system can attempt to link media information to related media analyzed by the system. Various other approaches to locating supplemental content can be used as well. If no (or very little) useful information is obtained, the content can be stored in some embodiments for subsequent analysis 716, such as at one or more later times when more information might be available. In some embodiments, unidentified content is only analyzed and/or stored for a certain period of time or number of attempts, etc., before being discarded or otherwise removed from consideration.

An added benefit to many such approaches is that additional information can be obtained as well that can be desirable to provide to a user. A copy of movie provided by a broadcaster or production company, for example, might include additional information such as actor information, identification of locations where specific scenes were shot, trivia information relating to the movie, or any of a number of other types of information disclosed or suggested herein. For media that is not provided with information but that is instead captured or otherwise obtained, however, such information typically will not be provided with the media. In such a situation, processes such as image recognition, voice recognition, etc., can be useful in obtaining additional information that can be provided to a consumer. For example, it might be possible to not only identify a product shown in an advertisement, but also the identity of an actor in the commercial or a song being played in the background. Various other types of information can be determined as well within the scope of the various embodiments.

When a consumer captures media content, it is possible, however, that the consumer did not actually capture the media content of interest. For example, a consumer might see a commercial of interest but by the time the consumer locates or maneuvers to the electronic device and activates a capture mechanism, it is possible that the commercial or other content of interest is no longer being displayed. Systems can methods in accordance with various embodiments can handle this in a number of different ways. For example, services recording broadcasts can track, at least for a period of time, the content that is contained in the broadcast. If a user captures content during a specific commercial, as can be determined by the content and the approximate time at which the content was captured, the system can determine one or more media segments that were broadcast before the captured segment. The system then can provide the user with an option to select the media content of interest that the user intended to capture, such as was described with respect to FIG. 6.

In another embodiment, the device capturing the media segment can be configured to continually capture, sample, or record a signal (audio and/or video) around the device, or contained in a broadcast for directly connected devices. The device can cache or store a loop of recently recorded information, such as was captured over the last 10-20 seconds or another appropriate period of time. After that period of time, the data is discarded such that only data for the most recent period of time (e.g., the most recent 10 seconds of data at any time) will be stored on the device. The data cache acts like a "sliding window" with respect to time, where the window is configured to represent the most recent period of data, and the data corresponding to the window is continually updated (the window "slides" forward with respect to time) in order to represent the most recent data. Since a user will almost always activate the capture after an item of interest has been broadcast, caching or otherwise temporarily storing the content over a period of time just prior to the activation can be likely to include at least a portion of the content that was of interest to the user.

In one embodiment, a user is able to press a button or otherwise signal interest in the media, which essentially causes the device to capture a snapshot of the data currently represented by the sliding window and stored in the corresponding buffer or cache. In some embodiments, data for a period of time after the users presses the button (or otherwise signals interest) is also captured, such that a total window of interest is generated that includes data in the buffer extending backwards in time per the sliding window, as well as a few seconds of data subsequent to the time of the user action. The total window of interest thus surrounds the time of the user's action (e.g., hitting a button) to include data from before and after the action. The data in the total window of interest can be combined with at least one timestamp corresponding to the time of user action. This data can then be sent to a server or analyzed as described elsewhere in the draft. If the user expresses an interest in some advertisement or product placement in the broadcast stream, as based at least in part upon the timestamp, an appropriate module of the user device can cause information for the recorded audio, as well as the corresponding timestamp, to be transmitted to the matching service.

In an embodiment with a connected device such as a gaming console, the gaming console can continually record information being broadcast over one or more stations, such as a currently viewed station, and pre-buffer or otherwise store a constantly updating recently-broadcast period of information. The user can activate a capture or matching process by selecting or otherwise performing an input action, such as by pressing a button on a gaming controller or selecting an input on a remote controller, etc. The gaming console can be connected to a network such as the Internet, and can send a hash (or other representation of the recording) to the matching service. As mentioned, the matching service typically will have been primed with the fingerprints of the audio for certain programming, advertisements, and product placements, for example, and can attempt to locate a match. As mentioned, the timestamp can be used to assist in matching content where the service has access to various broadcast feeds and the media was captured from a broadcast feed. If multiple media segments are included within the captured time period, the user can receive information for each or an option to select to receive information for at least one of those segments. In this example where the gaming console is connected to the network, the supplemental content can be pushed onto the console in some embodiments for current display or subsequent retrieval, etc.

In some embodiments, the user can have an application (e.g., an "app") stored on a computing device, such as a smart phone or portable media player, that is able to direct the capture of audio and/or video information, or at least access captured media information, and analyze at least a portion of the media information such that the user device does not have to upload large amounts of data to a central server or other such location. Further, use of such an application can enable a user to set preferences or specify other such information that can be used to determine information such as the types of information to retrieve, devices to receive the supplemental content, and other such aspects.

Figure 8:
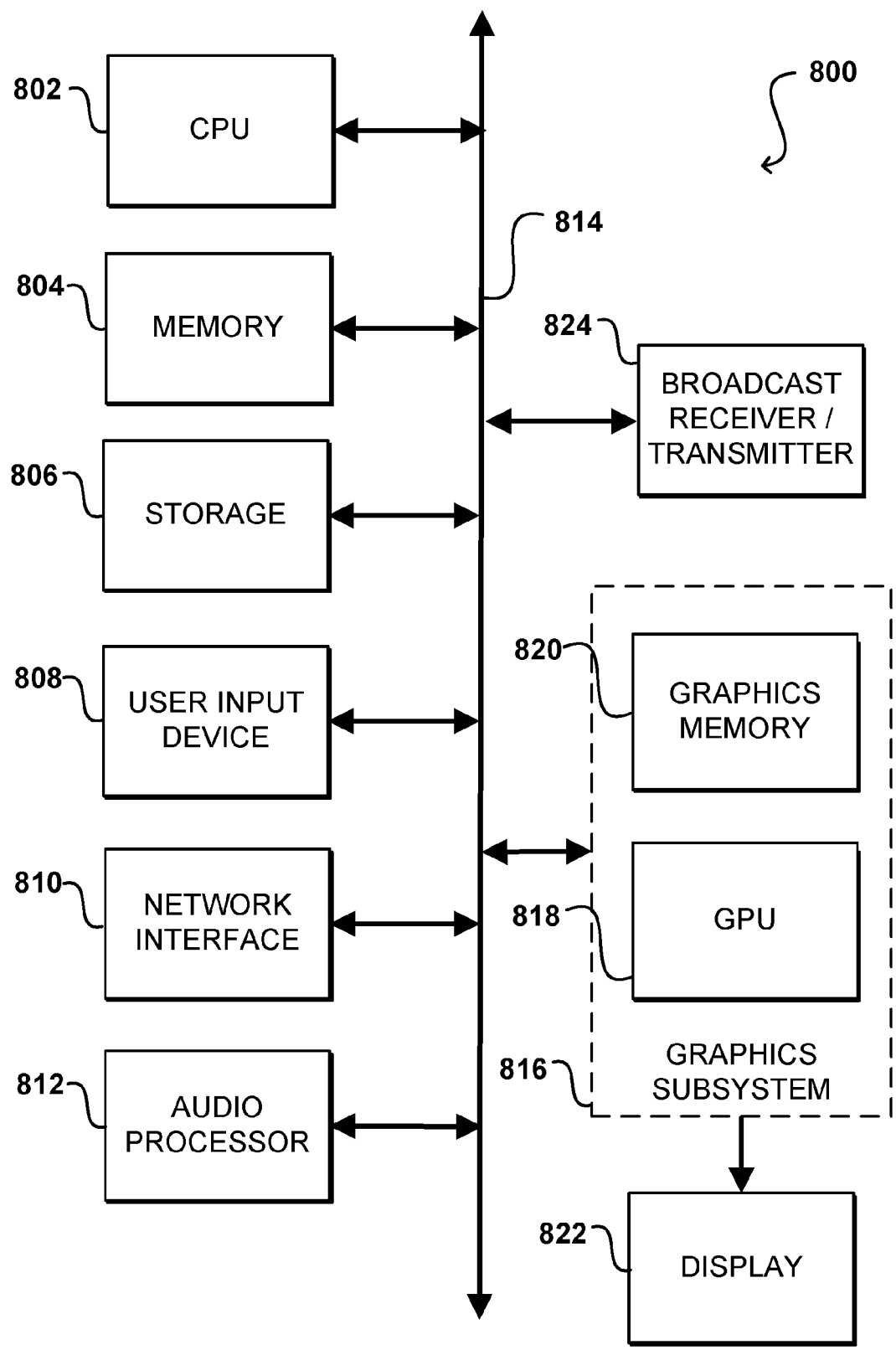
FIG. 8 illustrates components of an example device that can be used to perform aspects of the various embodiments.

FIG. 8 illustrates an exemplary hardware system suitable for implementing a device in accordance with one embodiment. This block diagram illustrates a computer system 800, such as a personal computer, video game console, personal digital assistant, or other digital device, suitable for practicing an embodiment of the invention. Computer system 800 includes a central processing unit (CPU) 802 for running software applications and optionally an operating system. CPU 802 may be comprised of one or more homogeneous or heterogeneous processing cores. Memory 804 stores applications and data for use by the CPU 802. Storage 806 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 808 communicate user inputs from one or more users to the computer system 800, examples of which may include keyboards, mice, joysticks, touch pads, touch screens, still or video cameras, and/or microphones. Network interface 810 allows computer system 800 to communicate with other computer systems via an electronic communications network, and may include wired or wireless communication over local area networks and wide area networks such as the Internet. An audio processor 812 is adapted to generate analog or digital audio output from instructions and/or data provided by the CPU 802, memory 804, and/or storage 806. The components of computer system 800, including CPU 802, memory 804, data storage 806, user input devices 808, network interface 810, and audio processor 812 are connected via one or more data buses 822.

A graphics subsystem 814 is further connected with data bus 822 and the components of the computer system 800. The graphics subsystem 814 includes a graphics processing unit (GPU) 816 and graphics memory 818. Graphics memory 818 includes a display memory (e.g., a frame buffer) used for storing pixel data for each pixel of an output image. Graphics memory 818 can be integrated in the same device as GPU 816, connected as a separate device with GPU 816, and/or implemented within memory 804. Pixel data can be provided to graphics memory 818 directly from the CPU 802. Alternatively, CPU 802 provides the GPU 816 with data and/or instructions defining the desired output images, from which the GPU 816 generates the pixel data of one or more output images. The data and/or instructions defining the desired output images can be stored in memory 804 and/or graphics memory 818. In an embodiment, the GPU 816 includes 3D rendering capabilities for generating pixel data for output images from instructions and data defining the geometry, lighting, shading, texturing, motion, and/or camera parameters for a scene. The GPU 816 can further include one or more programmable execution units capable of executing shader programs.

The graphics subsystem 814 periodically outputs pixel data for an image from graphics memory 818 to be displayed on display device 820. Display device 820 can be any device capable of displaying visual information in response to a signal from the computer system 800, including CRT, LCD, plasma, and OLED displays. Computer system 800 can provide the display device 820 with an analog or digital signal.

In accordance with various embodiments, CPU 802 is one or more general-purpose microprocessors having one or more processing cores. Further embodiments can be implemented using one or more CPUs with microprocessor architectures specifically adapted for highly parallel and computationally intensive applications, such as media and interactive entertainment applications.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for requesting information, comprising:
    playing media content of a video presentation on a user device, said media content comprising first video content presentation and second video content presentation;
    framing recently played media content in a sliding window as said media content is being played;
    receiving a user input requesting supplemental information associated with a first portion of said media content that is of interest to a user, wherein said first portion corresponds to said first video content presentation;
    capturing media file information of said media content that is framed in said sliding window based on said user input, wherein said media file information includes said first portion of said media content and a second portion of said media content that is not of interest to said user, wherein said second portion is being displayed when receiving said user input, wherein said second portion corresponds to said second video content presentation;
    sending said media file information to a back-end server for identification of said first video content presentation and said second video content presentation in a request for said supplemental information from said back-end server; and
    receiving said supplemental information corresponding to the first video content presentation for playing on said user device.

2. The method of claim 1, further comprising:
    playing audio of said supplemental information.

3. The method of claim 1, further comprising:
    playing video of said supplemental information.

4. The method of claim 1, further comprising:
    displaying text of said supplemental information.

5. The method of claim 1, further comprising:
    storing said media content continually framed in said sliding window in a buffer; and
    continually updating said media content stored in said buffer in association with data currently being displayed.

6. The method of claim 1, wherein said capturing media file information comprises:
    receiving said user input at a first time;
    capturing said media file information-including media content played at and before said first time.

7. The method of claim 6, further comprising:
    allowing said buffer to store data played after said first time; and
    capturing said media file information including media content played after said first time.

8. The method of claim 1, wherein said capturing media file information comprises:
    capturing a time stamp corresponding to said receiving said user input.

9. The method of claim 1, further comprising:
    receiving a stream of said video presentation.

10. The method of claim 1, further comprising:
    receiving a live stream of said video presentation.

11. The method of claim 1, further comprising:
    receiving a first option for selection requesting first supplemental information corresponding to said first portion; and
    sending a selection of said first option by said user device in order to request said supplemental information corresponding to said first video content presentation.

12. The method of claim 11, further comprising:
    receiving a second option for selection requesting second supplemental information corresponding to said second portion.

13. The method of claim 1, wherein said media file information comprises metadata.

14. A non-transitory computer-readable medium storing a computer program for requesting information, comprising:
    program instructions for playing media content of a video presentation on a user device, said media content comprising first video content presentation and second video content presentation;
    program instructions for framing recently played media content in a sliding window as said media content is being played;
    program instructions for receiving a user input requesting supplemental information associated with a first portion of said media content that is of interest to a user, wherein said first portion corresponds to said first video content presentation;
    program instructions for capturing media file information of said media content that is framed in said sliding window based on said user input, wherein said media file information includes said first portion of said media content and a second portion of said media content that is not of interest to said user, wherein said second portion is being displayed when receiving said user input, wherein said second portion corresponds to said second video content presentation;
    program instructions for sending said media file information to a back-end server for identification of said first video content presentation and said second video content presentation in a request for said supplemental information from said back-end server; and
    program instructions for receiving said supplemental information corresponding to the first video content presentation for playing on said user device.

15. The computer-readable medium of claim 14, further comprising:
    program instructions for storing said media content continually framed in said sliding window in a buffer; and
    program instructions for continually updating said media content stored in said buffer in association with data currently being displayed.

16. The computer-readable medium of claim 14, wherein said program instructions for capturing media file information comprises:
    program instructions for receiving said user input at a first time;
    program instructions for capturing said media file information including media content played at and before said first time.

17. The computer-readable medium of claim 16, further comprising:
    program instructions for allowing said buffer to store media content played after said first time; and
    program instructions for capturing said media file information including media content played after said first time.

18. A method for requesting information, comprising:
    playing media content of a video presentation on a user device, said media content comprising first video content presentation and second video content presentation;
    framing recently played media content in a sliding window as said media content is being played;
    receiving a user input requesting supplemental information associated with a first portion of said media content that is of interest to a user, wherein said first portion corresponds to said first video content presentation;
    capturing media file information of said media content that is framed in said sliding window based on said user input, wherein said media file information corresponds to said first portion of said media content and corresponds to a second portion of said media content that is not of interest to said user, wherein said second portion is being displayed when receiving said user input, wherein said second portion corresponds to said second video content presentation;
    sending said media file information to a back-end server for identification of said first video content presentation and said second video content presentation in a request for said supplemental information from said back-end server;
    receiving for display from said back-end server a first option for selection that when selected requests first supplemental information corresponding to said first video content presentation; and
    receiving for display from said back-end server a second option for selection that when selected requests second supplemental information corresponding to said second video content presentation.

19. The method of claim 18, further comprising:
    receiving from said back-end server said first supplemental information for display in response to selection of said first option; and
    receiving from said back-end server said second supplemental information for display in response to selection of said second option.

20. The method of claim 18, wherein said media file information comprises metadata.

21. The method of claim 18, wherein said media file information comprises said first portion of said media content and said second portion of said media content both displayable on said user device.

22. The method of claim 18, further comprising:
    receiving said user input at a first time; and
    capturing said media file information including media content played at and before said first time.

* * * * *